US008428869B2

(12) United States Patent
Gill et al.

(10) Patent No.: US 8,428,869 B2
(45) Date of Patent: Apr. 23, 2013

(54) CONTEXT ENABLED ADDRESS SELECTION

(75) Inventors: Regan Gill, Berkley, CA (US); Darrell Sano, Oakland, CA (US); Kevin Masao Tsurutome, San Francisco, CA (US)

(73) Assignee: TeleCommunication Systems, Inc., Annapolis, MD (US)

(*) Notice: Subject to any disclaimer, the term of this patent is extended or adjusted under 35 U.S.C. 154(b) by 585 days.

(21) Appl. No.: 12/155,822

(22) Filed: Jun. 10, 2008

(65) Prior Publication Data

US 2009/0254273 A1 Oct. 8, 2009

Related U.S. Application Data

(60) Provisional application No. 61/064,985, filed on Apr. 7, 2008.

(51) Int. Cl.
*G01C 21/26* (2006.01)
*G06F 19/00* (2006.01)

(52) U.S. Cl.
USPC ......... 701/410; 701/431; 701/439; 340/995.1

(58) Field of Classification Search .................. 701/201, 701/207, 208, 211; 707/3, 5, 104.1; 340/995.1; 455/422.1
See application file for complete search history.

(56) References Cited

U.S. PATENT DOCUMENTS

| 5,359,529 A | 10/1994 | Snider |
| 5,832,408 A * | 11/1998 | Tamai et al. .................. 701/400 |
| 6,064,941 A | 5/2000 | Nimura |
| 6,119,013 A | 9/2000 | Maloney |
| 6,401,034 B1 | 6/2002 | Kaplan |
| 6,424,912 B1 | 7/2002 | Correia |
| 6,434,482 B1 * | 8/2002 | Oshida et al. .................. 701/209 |
| 6,470,189 B1 | 10/2002 | Hill |
| 6,487,495 B1 * | 11/2002 | Gale et al. ..................... 701/461 |
| 6,507,785 B1 | 1/2003 | Stefan |
| 6,529,143 B2 * | 3/2003 | Mikkola et al. ............ 340/995.1 |
| 6,571,169 B2 * | 5/2003 | Miyaki .......................... 701/200 |

(Continued)

FOREIGN PATENT DOCUMENTS

| EP | 1128163 | 8/2001 |
| JP | 2008 039698 | 2/2008 |
| WO | WO2006/125291 | 5/2005 |
| WO | WO2006/071271 | 7/2006 |

OTHER PUBLICATIONS

Internal Search Report received in PCT/US2008/10542 dated Nov. 26, 2008.

(Continued)

*Primary Examiner* — Tan Q Nguyen
(74) *Attorney, Agent, or Firm* — William H. Bollman

(57) ABSTRACT

A system allows a user to select an individual address from the multiple addresses for additional information on that particular address. Multiple addresses can be viewed together on a map for selection purposes. Selection of a particular address can trigger new GUIs for presentation of context information for a particular location to a user. Context information can include differing map views, e.g., map view, satellite view, terrain view, etc., landmarks, photos taken from that particular address, local businesses, telephone numbers for that particular address, etc. Presentation of context information can assist a user in making a more informed decision as to which addresses from multiple presented possible addresses to select. Context information provide criteria to select and/or rule out a particular address.

20 Claims, 9 Drawing Sheets

U.S. PATENT DOCUMENTS

| | | | |
|---|---|---|---|
| 6,587,782 B1 * | 7/2003 | Nocek et al. | 701/200 |
| 6,820,092 B2 | 11/2004 | Nakano | |
| 6,940,407 B2 | 9/2005 | Miranda-Knapp | |
| 7,093,286 B1 | 8/2006 | King | |
| 7,379,729 B2 | 5/2008 | Holland | |
| 7,409,219 B2 | 8/2008 | Levitan | |
| 7,627,656 B1 | 12/2009 | Anand et al. | 709/220 |
| 7,706,977 B2 | 4/2010 | Soehren | |
| RE42,927 E | 11/2011 | Want | |
| 2001/0021894 A1 | 9/2001 | Sakamoto | |
| 2001/0038626 A1 | 11/2001 | Dynarski | |
| 2001/0047241 A1 | 11/2001 | Khavakh | |
| 2002/0021231 A1 | 2/2002 | Schlager | |
| 2002/0037716 A1 | 3/2002 | McKenna | |
| 2002/0042819 A1 | 4/2002 | Reichert | |
| 2002/0082774 A1 | 6/2002 | Bloebaum | |
| 2002/0098851 A1 | 7/2002 | Walczak | |
| 2002/0190861 A1 | 12/2002 | Wentworth | |
| 2003/0033083 A1 | 2/2003 | Nakashima | |
| 2003/0050075 A1 | 3/2003 | Rangarajan | |
| 2003/0055555 A1 | 3/2003 | Knockheart | |
| 2003/0071728 A1 | 4/2003 | McDonald | |
| 2003/0095525 A1 | 5/2003 | Lavin | |
| 2003/0128211 A1 | 7/2003 | Watanabe | |
| 2003/0182052 A1 | 9/2003 | Delorme | |
| 2004/0003125 A1 | 1/2004 | Ichimura | |
| 2004/0023645 A1 | 2/2004 | Olsen | |
| 2004/0027258 A1 | 2/2004 | Pechatnikov | |
| 2004/0158829 A1 | 8/2004 | Beresin | |
| 2004/0185870 A1 | 9/2004 | Matsuda | |
| 2004/0203603 A1 | 10/2004 | Pierce | |
| 2004/0203873 A1 | 10/2004 | Gray | 455/456.1 |
| 2004/0215641 A1 | 10/2004 | Kuthuri | |
| 2004/0224702 A1 | 11/2004 | Chaskar | |
| 2004/0225437 A1 | 11/2004 | Endo | |
| 2004/0249568 A1 | 12/2004 | Endo | |
| 2005/0038876 A1 | 2/2005 | Chaudhuri | |
| 2005/0148342 A1 | 7/2005 | Sylvain | |
| 2005/0149253 A1 | 7/2005 | Nambata | |
| 2005/0188333 A1 | 8/2005 | Hunleth | |
| 2005/0251331 A1 | 11/2005 | Kreft | |
| 2005/0288033 A1 | 12/2005 | McNew | |
| 2006/0015513 A1 | 1/2006 | Poyhonen et al. | 707/100 |
| 2006/0023626 A1 | 2/2006 | Krausz | |
| 2006/0055693 A1 | 3/2006 | Sylthe | |
| 2006/0064235 A1 | 3/2006 | Ishikawa | |
| 2006/0089792 A1 | 4/2006 | Manber et al. | |
| 2006/0105782 A1 | 5/2006 | Brock | |
| 2006/0116818 A1 * | 6/2006 | Chao et al. | 701/211 |
| 2006/0135178 A1 | 6/2006 | Allyn | |
| 2006/0155679 A1 | 7/2006 | Kothuri | |
| 2006/0167616 A1 | 7/2006 | Yamane | |
| 2006/0167621 A1 | 7/2006 | Dale | |
| 2006/0173841 A1 | 8/2006 | Bill | |
| 2006/0174209 A1 | 8/2006 | Barros | |
| 2006/0200308 A1 | 9/2006 | Arutunian | |
| 2006/0206586 A1 | 9/2006 | Ling | |
| 2006/0223518 A1 | 10/2006 | Haney | |
| 2006/0229802 A1 | 10/2006 | Vertelney et al. | |
| 2006/0246922 A1 | 11/2006 | Gasbarro | |
| 2007/0010942 A1 | 1/2007 | Bill | |
| 2007/0015518 A1 | 1/2007 | Winter | |
| 2007/0036318 A1 | 2/2007 | Gits et al. | 379/202.01 |
| 2007/0072620 A1 | 3/2007 | Levitan | |
| 2007/0083649 A1 | 4/2007 | Zuzga | |
| 2007/0118520 A1 | 5/2007 | Bliss | |
| 2007/0153983 A1 | 7/2007 | Bloebaum | |
| 2007/0156334 A1 | 7/2007 | Vu | |
| 2007/0162942 A1 | 7/2007 | Hamynen | |
| 2007/0174259 A1 | 7/2007 | Amjadi | |
| 2007/0213043 A1 | 9/2007 | Son | 455/422.1 |
| 2007/0219706 A1 | 9/2007 | Sheynblat | |
| 2007/0219708 A1 | 9/2007 | Brasche | |
| 2007/0233817 A1 | 10/2007 | Johnson et al. | |
| 2007/0238472 A1 | 10/2007 | Wanless | |
| 2007/0253642 A1 | 11/2007 | Berrill | |
| 2007/0288613 A1 | 12/2007 | Sudame et al. | 709/223 |
| 2008/0071465 A1 | 3/2008 | Chapman | |
| 2008/0112551 A1 | 5/2008 | Forbes et al. | 379/142.1 |
| 2008/0130597 A1 | 6/2008 | Kalhan | 370/338 |
| 2008/0139114 A1 | 6/2008 | Ranganathan | 455/41.1 |
| 2008/0140307 A1 * | 6/2008 | Chen et al. | 701/200 |
| 2008/0177462 A1 | 7/2008 | Yoshioka | |
| 2008/0177839 A1 | 7/2008 | Chang | |
| 2008/0218407 A1 | 9/2008 | Norda | |
| 2008/0249983 A1 | 10/2008 | Meisels | |
| 2008/0261560 A1 | 10/2008 | Ruckart | 455/411 |
| 2008/0268822 A1 | 10/2008 | Johnson | |
| 2008/0270366 A1 | 10/2008 | Frank | |
| 2008/0275637 A1 | 11/2008 | Kim | |
| 2008/0280599 A1 | 11/2008 | Cheng | |
| 2008/0307445 A1 | 12/2008 | Garg | 719/328 |
| 2009/0009397 A1 | 1/2009 | Taylor | |
| 2009/0029693 A1 | 1/2009 | Liwell | |
| 2009/0055087 A1 | 2/2009 | Beacher | |
| 2009/0061852 A1 | 3/2009 | Feher | |
| 2009/0100037 A1 | 4/2009 | Scheibe | |
| 2009/0192702 A1 | 7/2009 | Bourne | |
| 2009/0237307 A1 | 9/2009 | Tsai | |
| 2009/0325615 A1 | 12/2009 | Mckay | |
| 2010/0113072 A1 | 5/2010 | Gibson | |
| 2010/0214117 A1 | 8/2010 | Hazzani | |
| 2011/0035141 A1 | 2/2011 | Barker | |

OTHER PUBLICATIONS

Internal Search Report received in PCT/US2008/12621 dated Jan. 8, 2009.

Internal Search Report received in PCT/US2009/02016 dated May 27, 2009.

International Search Report in PCT/US2008/10543 dated Aug. 19, 2010.

International Search Report in PCT/US2008/10542 dated Aug. 19, 2010.

PCT International Search Report in PCT/US2009/05487 dated Nov. 17, 2009.

International Search Report in PCT/US2009/02016 dated Jul. 26, 2010.

International Search Report in PCT/US2009/05486 dated Jan. 21, 2010.

Internal Search Report received in PCT/US2008/10543 dated Dec. 11, 2008.

Ahern et al., "World Explorer: Visualizing Aggregate Data from Unstructured Text in Geo-Referenced Collections," Jun. 18-23, 2007, ACM, JCDL'07.

European Search Report received in European Appl. No. 09819547.2 dated Oct. 16, 2012.

European Search Report received in European Appl. No. 09819546.4 dated Oct. 15, 2012.

John Krumm et al, "Map Matching with Travel Time Constraints", SAE 2007 World Congress, Apr. 19, 2007.

* cited by examiner

CONTEXT ENABLED ADDRESS SELECTION

The present application claims priority from U.S. Provisional Application 61/064,985, entitled "CONTEXT ENABLED ADDRESS SELECTION" to Gill et al., filed Apr. 7, 2008, the entirety of which is expressly incorporated herein by reference.

BACKGROUND OF THE INVENTION

1. Field of the Invention

This invention relates generally to wireless telecommunication, navigation, and geocoding. More particularly, it relates to location based services, and more particularly to navigation using location based services.

2. Background of the Related Art

When using a directions or navigation application, the destination for a route or point of interest search must be accurate to be useful. However many addresses within a city or region may be very similar and occasionally they can only be differentiated by postal codes, information that may not be available to the user. In addition users may only know the street name, or may have the number of the building incorrect. Once they have provided the information available to a mapping server, several addresses may be returned from which the user must select the correct one. Since the user may not be able to distinguish the correct one, they must either guess and take the chance of going far out of their way or give up. Even the most user friendly mapping server can't solve this problem if it must rely on providing only text information.

Products are conventionally available that provide basic geocoding functionality, e.g., TeleNav, Garmin, VZ Navigator, and Sprint Navigator. Web site products include maps.google.com; maps.yahoo.com; and maps.live.com.

However, with respect to existing applications, if an address doesn't have an exact match in the mapping server, the user is provided with a list of possible matches that resemble the entered information in some way. The conventional systems attempt to find close matches to help a user, but nothing more than a text list of addresses is provided to the user.

FIG. 9 shows conventional graphic user interface (GUI) designs for allowing a user to enter an address of interest, displaying results for that entered address, and displaying directions to that entered address.

In particular, as show in FIG. 9, a user is presented with a first graphic user interface (GUI) 910 for entering a city name and state name. Upon completion of the city name and state name, a user can choose the "select" option to proceed to the second GUI 920.

Second GUI 920 allows a user to enter additional information to complete the entry of an address of interest. Second GUI 920 allows a user to enter a street number and street name. As shown in GUI 920, many conventional systems allow a user to enter a partial street name, the partial street name is used to provide a user with a list of street names that may complete the partially entered address of interest. Upon completion of the street number and street name, a user choose the "select" option to proceed to the third GUI 930.

Third GUI 930 provides an indication to a user that the user's entered criteria for an address of interest results in multiple matches. The user is further given an indication that the user will be presented with a list of the multiple matches from which to select an address of interest for their route destination.

Fourth GUI 940 provides a textual list of multiple addresses to a user that match criteria entered in GUIs 910 and 920. A user selects a single address from the list of multiple addresses. Upon selection of a single street number and street name, a user can choose the "select" option to proceed to fifth GUI 950.

Following a list of multiple addresses given to a user that match criteria entered in GUIs 910 and 920, a fifth GUI 950 provides an indication that the current position of the user's navigation device is being determined. A progress bar is often used to indicate the amount of progress made toward determining a current position of a user's navigation device.

Sixth GUI 960 provides a user with a graphic view of their current position, often indicated with an icon of an automobile, and their address of interest, often indicated with an icon of a house. A calculated route is shown between the automobile icon and the house icon indicating a route that the user will be guided over.

Following a graphic view of a route from their current position and their address of interest, seventh GUI 970 provides a user with route guidance information indicating distances to turns, street names for turns, direction to turn, time traveled, estimated time of arrival, total distance, current location along a route, etc. Such information allows a user to easily navigate to their address of interest.

The disadvantage of the current technology is that a user searching for an address of interest may not have enough information to be able to properly choose which address from multiple returned addresses is correct. The multiple returned addresses given to a user lack any type of context with which a user can make an informed choice.

There is a need for an improved method by which a user is able to select an address of interest from a list of multiple returned addresses.

SUMMARY OF THE INVENTION

In accordance with the principles of the invention, a method and apparatus for providing context information for a geographic location comprises initiating a database query for a supplied search criteria. A plurality of geographic locations are found that match the search criteria, or if no exact match is found, a plurality that are close matches. Mapping data is provided that comprises the plurality of geographic locations. An option to view context information is provided for at least one of the plurality of geographic locations.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The inventors herein have recognized that commercially available products do not provide a contextual technique for comparing a plurality of addresses. The present invention provides context information to assist a user in choosing a correct address: a map with multiple possible addresses marked to provide geographic context for comparison, the addition of landmarks and nearby businesses marked on the map, and images of the nearby locations, e.g., pictures taken from a location of interest, for more visual context. All of this context information assists a user in determining a desired address from multiple addresses presented to the user.

A user is able to select an individual address from the multiple addresses for additional information on that particular address. Selection of a particular address can trigger new GUIs for presentation of context information for a particular location to a user. Context information can include differing map views, e.g., map view, satellite view, terrain view, etc., landmarks, local businesses, photos taken from, nearby or above that particular address, telephone numbers for that particular address, etc. Presentation of context information can assist a user in making a more informed decision as to which addresses from multiple presented possible addresses to select. Context information provides criteria to select and/or rule out a particular address.

Upon a user selecting an individual address from multiple presented addresses, the user is presented with a view of their current position and their address of interest and/or route guidance information.

Figure 1:
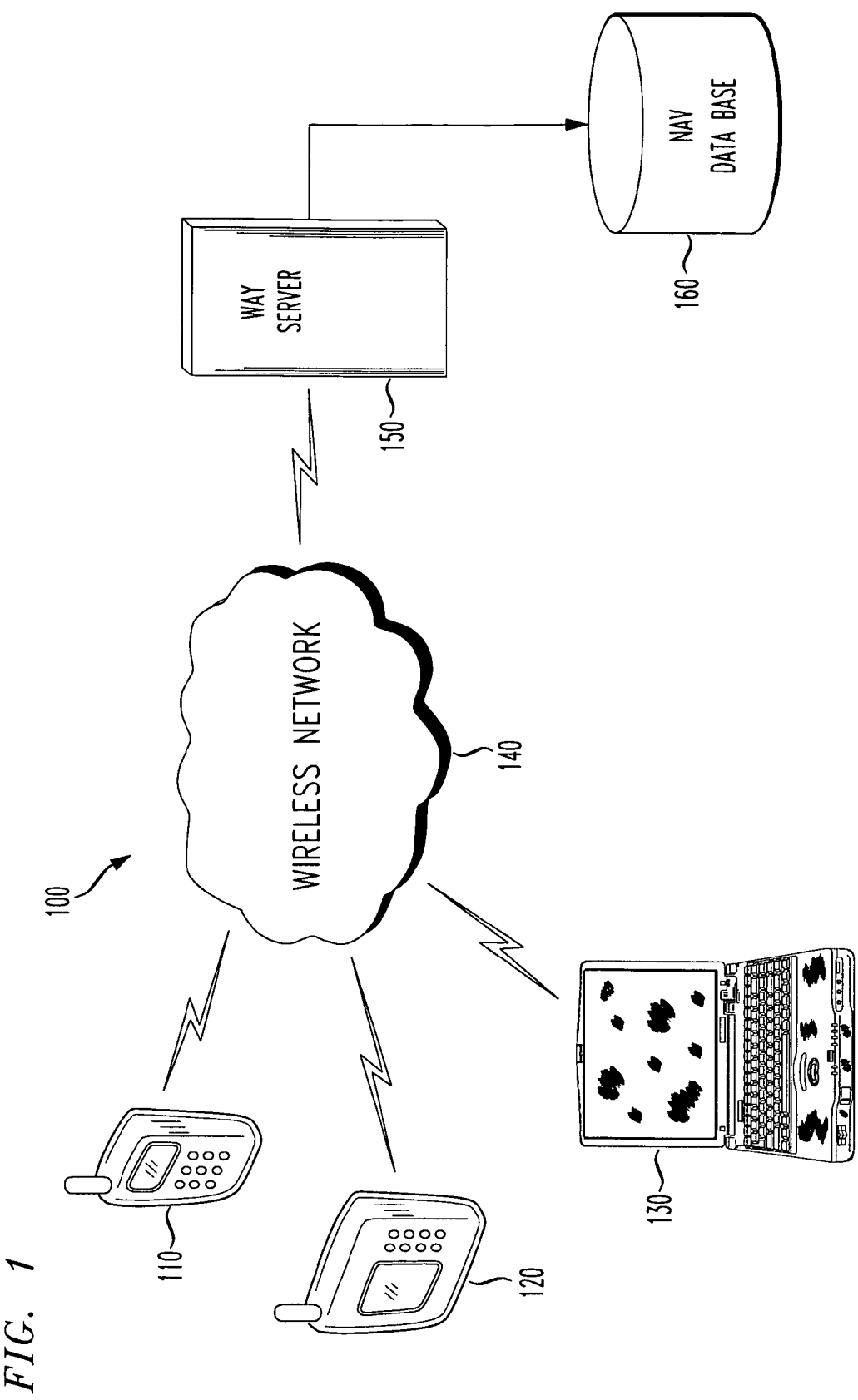
FIG. 1 shows a system for selecting an address of interest from a plurality of possible addresses within context of its location, in accordance with the principles of the present invention.

FIG. 1 shows a system for selecting an address of interest from a plurality of possible addresses within context of its location, in accordance with the principles of the present invention.

In particular, as shown in FIG. 1, a system 100 for selecting an address of interest from a plurality of possible addresses within context of its location can include various wireless devices that can display navigation information, such as a cellular telephone 110, a personal data assistant 120, a laptop computer 130.

Any of wireless devices 110, 120 and 130 can be used to allow a user to enter an address of interest into a GUI. The address of interest data is packaged into one or more data packets for transmission over the wireless network 140 to navigation server 150, as is known within the art.

A wireless network 140 allows the various wireless devices to communicate with a navigation server 150. Any wireless network can be employed that allows data communications for the transfer of navigation data between a wireless device 110, 120 and 130 and a navigation server 150.

The address of interest data is received by navigation server 150. Navigation server 150 formulates a database query with the address of interest data received from any of wireless device 110, 120 and 130. The database query is submitted by the navigation server 150 to the navigation database 160 to search the content of navigation database 160 for entries that match the address of interest data, as is known within the art.

In accordance with the principles of the present invention, if the address of interest transmitted by any of wireless devices 110, 120 and 130 results in multiple addresses being returned from navigation database 160, each of the multiple addresses returned from navigation database 160 are transmitted back to any of the wireless devices 110, 120 and 130. The multiple addresses are presented on a graphic view of a map together with options for a user to view context information associated with those multiple addresses. A graphic view of a map can include, e.g., a map view, a satellite view, a terrain view, etc. that will be show and discussed in more detail in relation to FIG. 6 below.

Any of wireless device 110, 120, or 130 submitting an address of interest to navigation server 150, receives the graphic view of a map that includes multiple icons for the multiple addresses that match a navigation database 160 query for the submitted address of interest. Each icon that matches the entered address of interest data can further include options to view additional context information associated with that particular icon. Context information can include differing map views, e.g., map view, satellite view, terrain view, etc., landmarks, photos taken from that particular address, telephone numbers for that particular address, etc. Presentation of context information can assist a user in making a more informed decision as to a particular destination from the multiple addresses that match a navigation database 160 query for the submitted address of interest. Context information can assist a user in determining which of the possible multiple addresses to select as a destination for calculation of route guidance information. For example, they may know that the address is near a landmark, a geographic feature or a specific business. Additionally, or conversely, a user may know if the address is not near these things and thus rule out an incorrect address.

Selection of a particular destination from the multiple addresses that match a navigation database 160 query for a submitted address of interest results in a user being presented with route guidance information, as is known within the art. Route guidance information can include a graphic map showing lines representing a formulated route by navigation server 150 and/or route guidance information. Route guidance information includes distances to turns, street names for turns, direction to turn, time traveled, estimated time of arrival, total distance, current location along a route, etc., as shown in detail in GUI 270 Such information allows a user to easily navigate to their destination address of interest.

Although FIG. 1 exemplarily shows wireless devices 110, 120 and 130 accessing a remote navigation server 150, the principles of the present invention apply equally to handheld navigation devices that have a navigation database 160 built into the device themselves. Accordingly, functions described herein as being performed by the navigation server 150 accessing navigation database 160 would be performed by a handheld navigation device itself without wirelessly transmitting an address of interest and wirelessly receiving navigation data from a navigation server 150.

Figure 2:
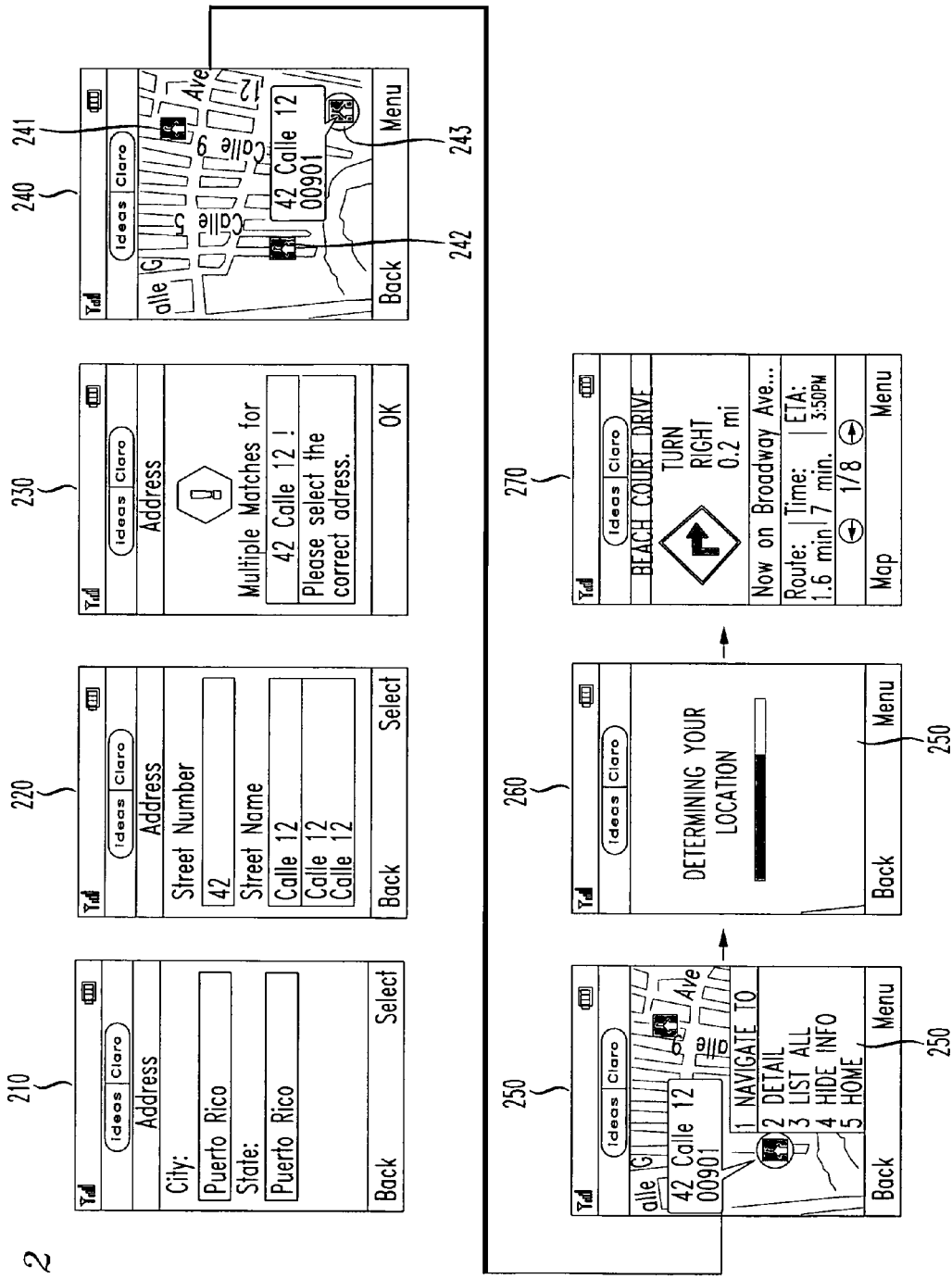
FIG. 2 shows graphic user interface (GUI) designs exemplifying how a user would search for a destination address and would be provided a graphic map showing multiple matches resulting from the user supplied address of interest, in accordance with the principles of the present invention.

FIG. 2 shows graphic user interface (GUI) designs exemplifying how a user would search for a destination address and would be provided a graphic map showing multiple matches resulting from the user supplied address of interest, in accordance with the principles of the present invention.

The drawings depicted in accordance with the principles of the present invention show GUIs exemplifying how a user would access and navigate contextual information easily even in a small screened mobile application. However, the principles of the invention disclosed herein apply equally to GUIs for accessing and navigating contextual information on any screen size for both mobile mapping applications and stationary web mapping sites, such as Mapquest, Google Maps, Yahoo! Maps, etc.

In particular, as show in FIG. 2, a user is presented with a first graphic user interface (GUI) 210 for entering a city name and state name. Upon completion of the city name and state name, a user can choose the "select" option to proceed to second GUI 220.

Second GUI 220 allows a user to enter additional information to complete an entry of an address of interest. Second GUI 220 allows a user to enter a street number and street name. As shown, many conventional systems allow a user to enter a partial street name, the partial street name used to provide a user with a list of street names that may be included with an address of interest. Upon completion of the street number and street name, a user can choose the "select" option to proceed to third GUI 230.

Third GUI 230 provides an indication to a user that the user's entered criteria for an address of interest resulted in multiple matches. The user is further given an indication that the user will be presented with a list of the multiple matches from which to select an address of interest as a route destination.

Fourth GUI 240 deviates from conventional textual listing of multiple addresses. Instead, a user is provided with a graphic map with an icon for each of the multiple addresses that resulted from the multiple matches indicated on GUI 230, shown as icons 241, 242 and 243. A user can select any individual icon to receive context information for that particular location. Selecting an individual icon from the plurality of icons can be performed by various methods including, e.g., touching the screen icon on a touch screen display, using a mouse, using arrow keys, using a tab key, using the number keypad, etc.

Selection of an individual icon from the plurality of icons that match the user's entered destination address results in GUI 250. GUI 250 provides a user with a menu of context information that is available for a particular address from the multiple addresses resulting from the destination address search performed with GUIs 210 and 220. Menu items such as, e.g., Navigate To, Detail, List All, Hide Info, and Home, can be displayed to assist a user in make an informed decision on a particular destination address from the multiple possible destination addresses shown as icons 241, 242 and 243. Selection of Navigate To menu option 1 results in GUI 260 being displayed for a user.

GUI 260 provides an indication that Navigation Server 150 is determining a current location for any of the wireless devices 110, 120 and 130. Determining a wireless device's location is well understood in the art and can be done through a number of means including GPS, assisted GPS, and RF triangulation. From the determination of a current location for any of the wireless devices 110, 120 and 130, Navigation Server 150 performs a routing calculation between the selected destination from GUI 250 and the determined current location of any of wireless devices 110, 120 and 130. Routing guidance information is transmitted from the navigation server 150 to any of the wireless devices 110, 120 and 130 requesting routing information.

GUI 270 provides an indication of the route guidance information that is provided by the navigation server 270. As is well known within the art, GUI 270 is continuously updated with new route guidance information as any of the wireless devices 110, 120 and 130 travel toward a destination address.

Figure 3:
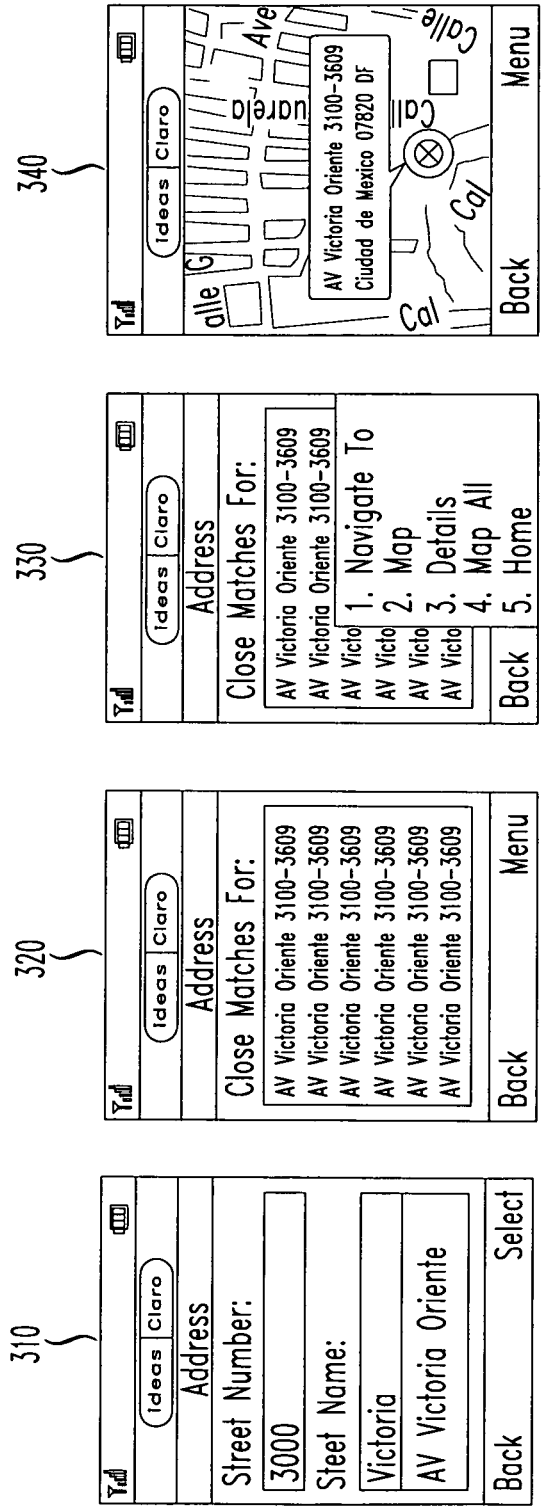
FIG. 3 shows graphic user interface (GUI) designs exemplifying how a user would view a list of close address matches when there is no match for the user entered address and how the user can chose to see the address on a map with context information.

FIG. 3 shows graphic user interface (GUI) designs exemplifying how a user may view a list of close address matches when there is no exact match for the user entered address and how the user can chose to see the address on a map with context information.

In particular, when a user entered address, as shown in GUI 310, has no exact match, multiple close matches may be provided in list form as shown in GUI 320 as is well known in the art. In accordance with the present invention, as shown in GUI 330, the user has access to menu options for each address and by choosing the Map option, the user can see a particular address on a map containing landmarks and other context information in addition to street and other standard geographic information as shown in GUI 340.

Figure 4:
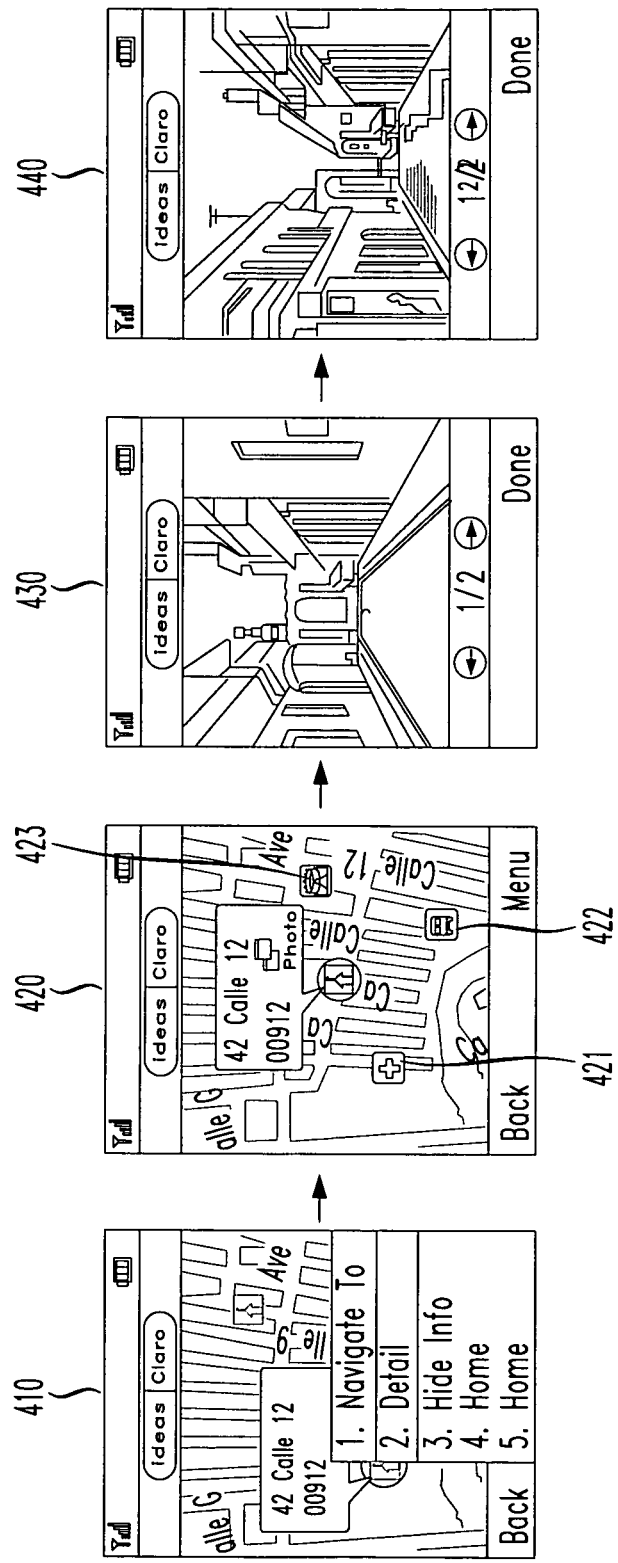
FIG. 4 shows graphic user interface (GUI) designs exemplifying how a user would select to receive details about a particular destination address from multiple destination addresses resulting from the user supplied destination address, in accordance with the principles of the present invention.

FIG. 4 shows graphic user interface (GUI) designs exemplifying how a user would select to receive details about a particular destination address from multiple destination addresses resulting from the user supplied destination address, in accordance with the principles of the present invention.

In particular, as shown in FIG. 4, selection of Detail menu option 2 in GUI 410 results in GUI 420 being displayed for a user. As shown, a detailed map view for the selected icon is displayed for a user that includes context information such as a nearby hospital 421, a nearby train\bus\rail station 422, a museum 423, and an indication that photos are available, the photos taken from, nearby or above the selected address.

Selection of an option to view a photo taken from the selected address results in display of GUIs 430 and 440. In this manner, a user can either make a more informed decision that a particular address is a correct destination and/or see that a destination is near during travels.

Figure 5:
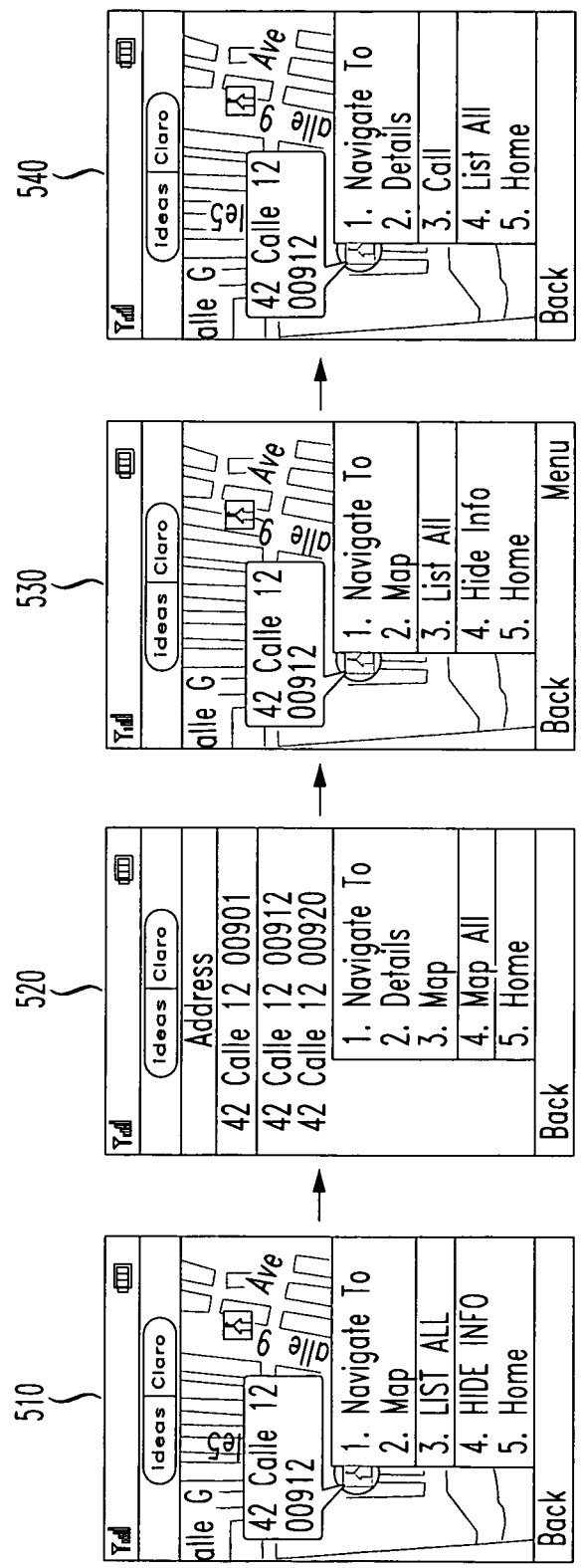
FIG. 5 shows graphic user interface (GUI) designs exemplifying how a user can switch between a textual list of multiple destination addresses resulting from the user supplied destination address and a graphical representation thereof; and how a user can call a telephone number associated with a selected address, in accordance with the principles of the present invention.

FIG. 5 shows graphic user interface (GUI) designs exemplifying how a user can switch between a textual list of multiple destination addresses resulting from the user supplied destination address and a graphical representation thereof and visa versa; and how a user can call a telephone number associated with a selected address, in accordance with the principles of the present invention.

In particular, as show in FIG. 5, selection of "List All" menu option 3 from GUI 510 being selected results in GUI 520 being displayed for a user. GUI 520 is a textual list of the multiple destination addresses resulting from the user supplied destination address. A user selecting "Map All" menu option 4 on GUI 520 results in GUI 530 being displayed for a user, allowing the user to see all possible addresses matches in context on the same map.

GUI 540 shows an additional "Call" menu option 3. Selection of the "Call" menu option 3 results in formulation of a query of navigation database 160 by the navigation server 150 to search for a telephone number associated with a particular address. The telephone number is transmitted back to any of wireless devices 110, 120 and 130 through the wireless network 140. Any of wireless devices 110, 120 and 130 can receive the telephone number and either manually or automatically initiate a telephone call to the received telephone number.

Figure 6:
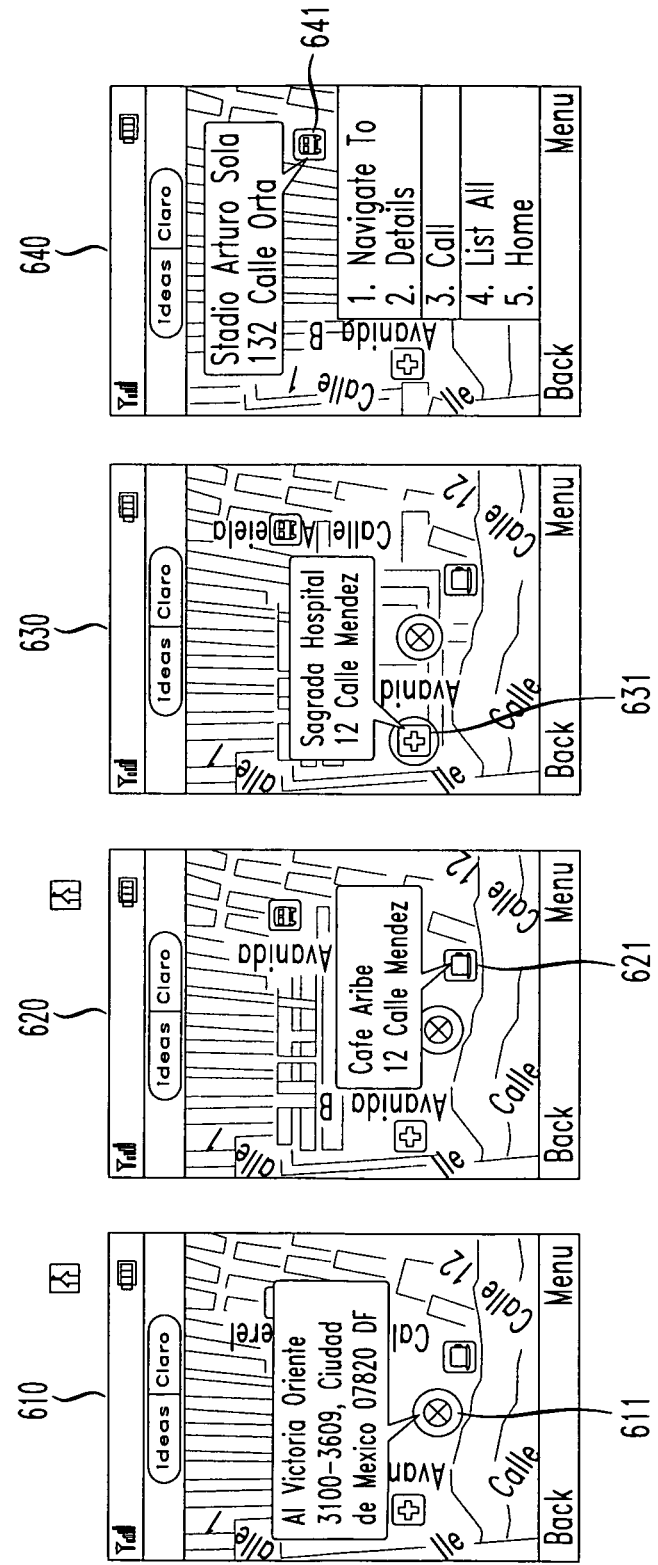
FIG. 6 shows graphic user interface (GUI) designs exemplifying how a user can view information for exemplary context landmarks and local businesses, in accordance with the principles of the present invention.

FIG. 6 shows graphic user interface (GUI) designs exemplifying how a user can view information for exemplary context landmarks and local businesses, in accordance with the principles of the present invention.

In particular, as shown in FIG. 6, GUI 610 shows the address of current interest 611 and GUI 620 shows a local business nearby, 621, with its address, which the user can select for further information or to call. GUI 630 shows a hospital landmark icon 631 that the user can select to receive additional information or to call.

GUI 640 shows a sports stadium 641 and the menu options available to the user for the selected item to receive details or to call.

GUIs 620, 630, and 640 extemporarily show context landmarks and businesses that include a hospital, a coffee shop, and a stadium. However, within the scope of the invention, any context landmark or other information with a latitude and longitude can be displayed that assists a user in selecting an address of interest from multiple presented addresses. Additional context landmarks can include nature parks, malls, shopping centers, amusement parks, police stations, fire stations, zoos, metro stations, etc. In addition, personal information the user has available may also be shown, such as recent or favorite addresses or the locations of family or friends when available though a friend or family finder application A user can select any of the icons from GUIs 620, 630 and 640 to receive context information for that particular location. Selecting an individual icon from the plurality of icons can be performed by various methods including, e.g., touching the screen icon on a touch screen display, using a mouse, using arrow keys, using a tab key, using the number keypad, etc.

Figure 7:
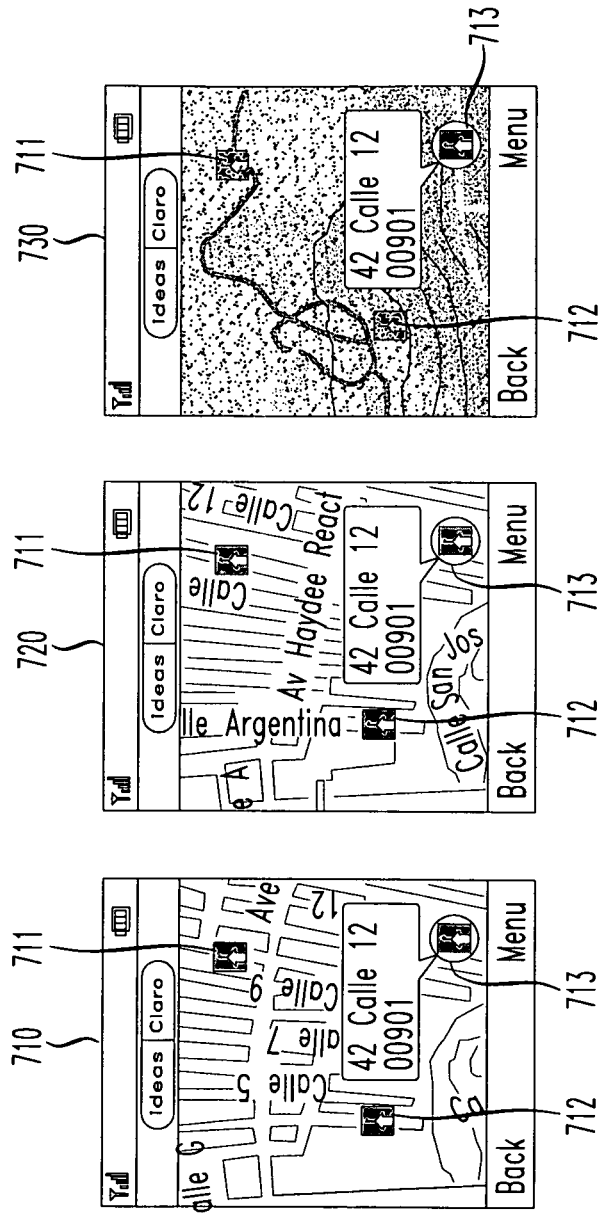
FIG. 7 shows graphic user interface (GUI) designs exemplifying various different types of context map views, in accordance with the principles of the present invention.

FIG. 7 shows graphic user interface (GUI) designs exemplifying various different types of context map views, in accordance with the principles of the present invention.

In particular, as shown in FIG. 7, GUI 710 shows a context map view with an icon for each of the multiple addresses that resulted from the multiple matches, shown as icons 711, 712 and 713. A context map view allows a user to easily view multiple addresses in an uncluttered street layout. Major bodies of water may be displayed, but minor bodies of water, such as smaller rivers are left off for clarity.

GUI 720 shows a context satellite view with an icon for each of the multiple addresses that resulted from the multiple matches, shown as icons 711, 712 and 713. A context satellite view is a satellite photo that includes all of the details aerially viewable within a given area. In some instances, a user may desire such an aerial view to assist in selecting a single address from the displayed icons 711, 712 and 713.

GUI 730 shows a context terrain view with an icon for each of the multiple addresses that resulted from the multiple matches, shown as icons 711, 712 and 713. A context terrain view shows only terrain details, such as shading to represent land contours and both large and small bodies of water. A user in some instances may know that an address of interest is near a certain elevation and/or near a body of water. The context terrain view can assist a user in such instances.

To provide context for the multiple matches, shown as icons 711, 712 and 713, a user can switch between any of the context map views shown in GUI 710, the context satellite view shown in GUI 720, and the context terrain view shown in GUI 730. Although not shown, a user can select to view additional context information for exemplary landmarks on any of GUIs 710, 720 and 730.

Figure 8:
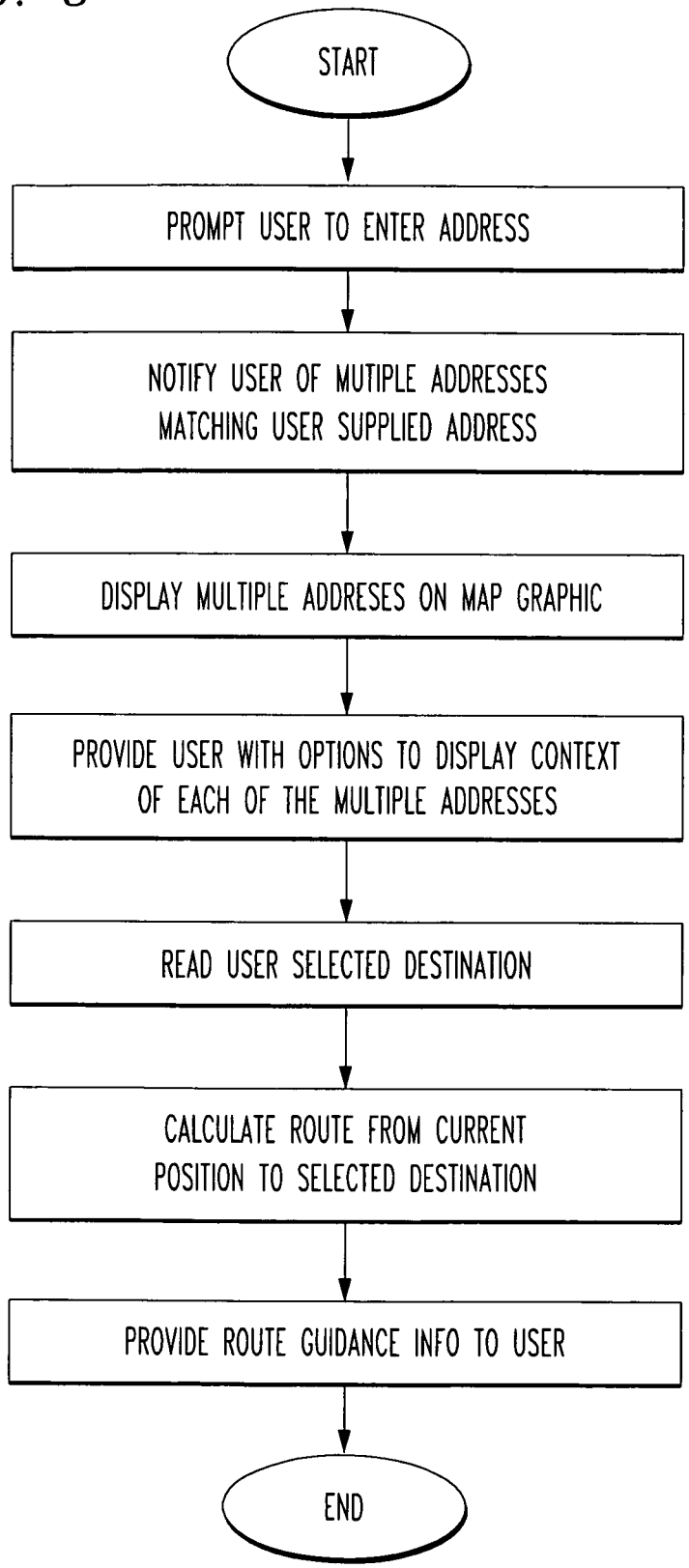
FIG. 8 shows an exemplary method of providing a graphic map that displays multiple addresses, in accordance with the principles of the present invention.
Figure 9:
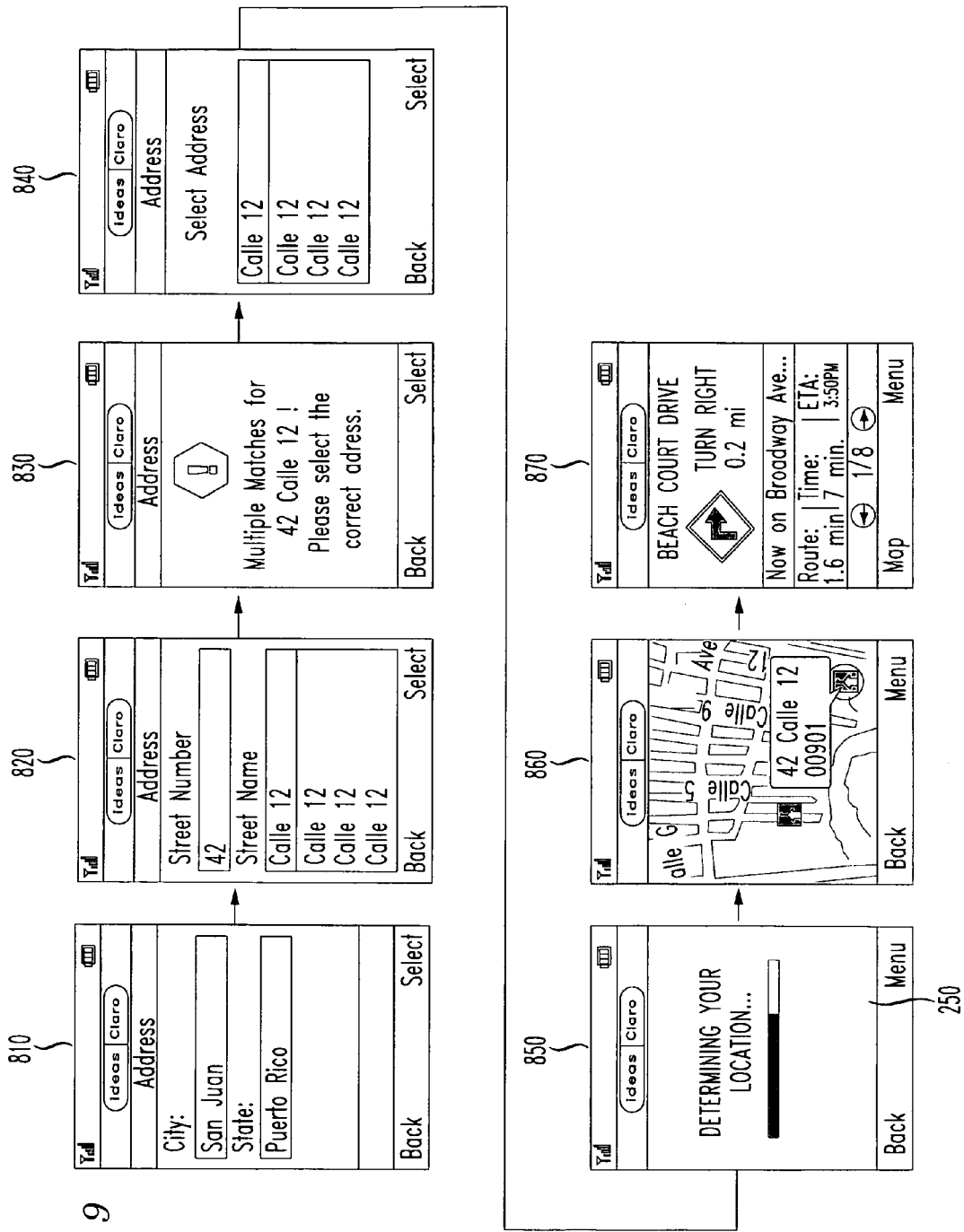
FIG. 9 shows conventional graphic user interface (GUI) designs for allowing a user to enter an address of interest, displaying results for that entered address, and displaying directions to that entered address.

FIG. 8 shows an exemplary method of providing a graphic map that displays multiple addresses, in accordance with the principles of the present invention.

In particular, as shown in step 810 of FIG. 8, a user enters a destination address of interest into their wireless device.

In step 820, the user's entered destination address of interest is searched in navigation database 160, with the user notified that multiple addresses match the user's entered address of interest from step 810.

In step 830, navigation server 150 returns a graphic map that includes an icon for each of the multiple addresses matching the user's entered destination address of interest from step 810. The graphic map and icons are displayed on any of the wireless devices 110, 120 and 130 that initiated a destination address of interest search.

In step 840, a user is provided with options to display context information associated with each of the icons presented to the user in step 830.

In step 850, any of the wireless devices 110, 120 and 130 reads a user's selection of an icon. Selection of an icon represents a user's desire to select an individual address from the multiple displayed destination addresses to receive route guidance information for.

In step 860, navigation server 150 receives the user's selection of a desired destination address from step 850. The navigation server 150 further calculates a route from a current position any of the wireless devices 110, 120 and 130 initiating a request for route guidance and the received desired destination address.

In step 870, route guidance information formulated in step 860 is transmitted from the navigation server 150 to any of the wireless devices 110, 120 and 130 initiating a request for route guidance.

The inventive technology described herein can also be combined with what is usually called friend and family finder functionality in which a geocoded location is provided for an individual. When viewing the location of the individual on the map, if the user is unfamiliar with the map area, the assistance context described herein can help identify the location in relation to more familiar landmarks.

In many countries outside North America, street addresses are not sequential and directions are provided by referring to landmarks rather than providing street names and numbers. This solution disclosed herein for contextual address searching provides additional benefits for users of international mapping products since there is less useful address information available in these countries.

The present invention has applicability with users of wireless maps, as well as with the provision of directions, and navigation applications. It also has application with users of web applications that provide maps and directions. The invention provides the ability to present multiple addresses on a map as a result of multiple or inexact matches for a user's address search input. It also provides additional information around an address for the intention of providing context to aid in the user's selection.

While the invention has been described with reference to the exemplary embodiments thereof, those skilled in the art will be able to make various modifications to the described embodiments of the invention without departing from the true spirit and scope of the invention.

What is claimed is:

1. A method of providing context information for a geographic location, comprising:
receiving, at a navigation server, a route guidance database query comprising route guidance search criteria including a geographic route beginning location and a geographic route destination location;

receiving, at said navigation server, a plurality of route guidance destinations that partially match said geographic route destination location; and providing, at said navigation server, said plurality of route guidance destinations and an option message including an option to display particular destination context information respectively associated with each of said plurality of route guidance destinations, augmenting selection of a particular one of said plurality of route guidance destinations.

2. The method of providing context information for a geographic location according to claim 1, wherein:
at least one of said plurality of route guidance destinations is a route guidance destination address.

3. The method of providing context information for a geographic location according to claim 1, wherein:
said destination context information is a picture associated with said particular route guidance destination.

4. The method of providing context information for a geographic location according to claim 1, wherein:
said destination context information is a telephone number associated with a particular route guidance destination.

5. The method of providing context information for a geographic location according to claim 1, wherein:
said destination context information is one or more businesses located nearby.

6. The method of providing context information for a geographic location according to claim 1, wherein:
said destination context information is a nearby landmark.

7. The method of providing context information for a geographic location according to claim 6, wherein:
said nearby landmark is a hospital.

8. The method of providing context information for a geographic location according to claim 6, wherein:
said nearby landmark is a museum.

9. The method of providing context information for a geographic location according to claim 6, wherein:
said nearby landmark is at least one of a train station, bus station, and rail station.

10. The method of providing context information for a geographic location according to claim 1, wherein:
said supplied search criteria is received over a wireless network.

11. A method of providing context information for a geographic location, comprising:
transmitting, at a wireless device, a route guidance database query for supplied route guidance search criteria including a geographic route beginning location and a geographic route destination location;

receiving, at said wireless device, a plurality of route guidance destinations that partially match said geographic route destination location; and receiving, at said wireless device, mapping data comprising said plurality of route guidance destinations and an option message including an option to display particular destination context information respectively associated with each of said plurality of route guidance destinations, augmenting selection of a particular one of said plurality of route guidance destinations.

12. The method of providing context information for a geographic location according to claim 11, wherein:
at least one of said plurality of route guidance destinations is an address.

13. The method of providing context information for a geographic location according to claim 11, wherein:
said destination context information is a picture associated with said particular route guidance destination.

14. The method of providing context information for a geographic location according to claim 11, wherein:
said destination context information is a telephone number associated with said particular route guidance destination.

15. The method of providing context information for a geographic location according to claim 11, wherein:
said destination context information is one or more businesses located nearby.

16. The method of providing context information for a geographic location according to claim 11, wherein:
said destination context information is a nearby landmark.

17. The method of providing context information for a geographic location according to claim 16, wherein:
said nearby landmark is a hospital.

18. The method of providing context information for a geographic location according to claim 16, wherein:
said nearby landmark is a museum.

19. The method of providing context information for a geographic location according to claim 16, wherein:
said nearby landmark is at least one of a train station, bus station, and rail station.

20. The method of providing context information for a geographic location according to claim 11, wherein:
said supplied search criteria is received over a wireless network.

* * * * *